United States Patent
Foster et al.

(10) Patent No.: US 10,521,852 B2
(45) Date of Patent: Dec. 31, 2019

(54) NETWORK-BASED GROCERY STORE

(71) Applicant: c2morrow IP, LLC, St. Cloud, MN (US)

(72) Inventors: Simon Foster, Golden Valley, MN (US); Bruce Clark, Watertown, MN (US); Chris Servais, Eagan, MN (US); Tom Zosel, Hawthorn Woods, IL (US)

(73) Assignee: c2morrow IP, LLC, Golden Valley, MN (US)

( * ) Notice: Subject to any disclaimer, the term of this patent is extended or adjusted under 35 U.S.C. 154(b) by 289 days.

(21) Appl. No.: 15/675,898

(22) Filed: Aug. 14, 2017

(65) Prior Publication Data

US 2018/0012289 A1  Jan. 11, 2018

Related U.S. Application Data

(63) Continuation of application No. 14/632,410, filed on Feb. 26, 2015, now Pat. No. 9,767,507, which is a continuation of application No. 12/508,143, filed on Jul. 23, 2009, now Pat. No. 8,972,043, which is a continuation of application No. 10/281,064, filed on Oct. 25, 2002, now abandoned.

(60) Provisional application No. 60/347,950, filed on Oct. 25, 2001.

(51) Int. Cl.
G06Q 30/00 (2012.01)
G08B 13/14 (2006.01)
G06Q 30/06 (2012.01)

(52) U.S. Cl.
CPC ......... *G06Q 30/0635* (2013.01); *G06Q 30/06* (2013.01); *G06Q 30/0601* (2013.01); *G06Q 30/0633* (2013.01)

(58) Field of Classification Search
None
See application file for complete search history.

(56) References Cited

U.S. PATENT DOCUMENTS

| | | |
|---|---|---|
| 3,908,800 A | 9/1975 | Drapeau |
| 4,672,553 A | 6/1987 | Goldberg |
| 5,812,986 A | 9/1998 | Danelski |
| 6,219,587 B1 | 4/2001 | Ahlin et al. |
| 6,246,998 B1 | 6/2001 | Matsumori |
| 6,289,260 B1 | 9/2001 | Bradley et al. |
| 6,332,334 B1 | 12/2001 | Faryabi |
| 6,622,127 B1 | 9/2003 | Klots et al. |
| 6,762,681 B1 * | 7/2004 | Danelski ............... B65G 1/137 340/5.2 |
| 6,873,881 B1 | 3/2005 | Schneible, Sr. |
| 7,072,737 B2 | 7/2006 | Lunak et al. |
| 7,139,637 B1 | 11/2006 | Waddington et al. |
| 7,568,627 B2 | 8/2009 | Lunak et al. |
| 7,766,242 B2 | 8/2010 | Lunak et al. |
| 2001/0018671 A1 | 8/2001 | Ogasawara |
| 2002/0070846 A1 | 6/2002 | Bastian, II et al. |

(Continued)

FOREIGN PATENT DOCUMENTS

| | | |
|---|---|---|
| WO | WO 00/68856 A2 | 11/2000 |
| WO | WO 00/68859 A2 | 11/2000 |

*Primary Examiner* — Ariel J Yu
(74) *Attorney, Agent, or Firm* — Dorsey & Whitney LLP

(57) ABSTRACT

The present invention is a method and system for a network-based grocery store. The invention provides for network-based order placement, fulfillment, and delivery.

16 Claims, 19 Drawing Sheets

(56) References Cited

U.S. PATENT DOCUMENTS

2002/0116276 A1 8/2002 Ottley
2002/0178074 A1* 11/2002 Bloom .................. G06Q 10/08
  705/26.81

* cited by examiner

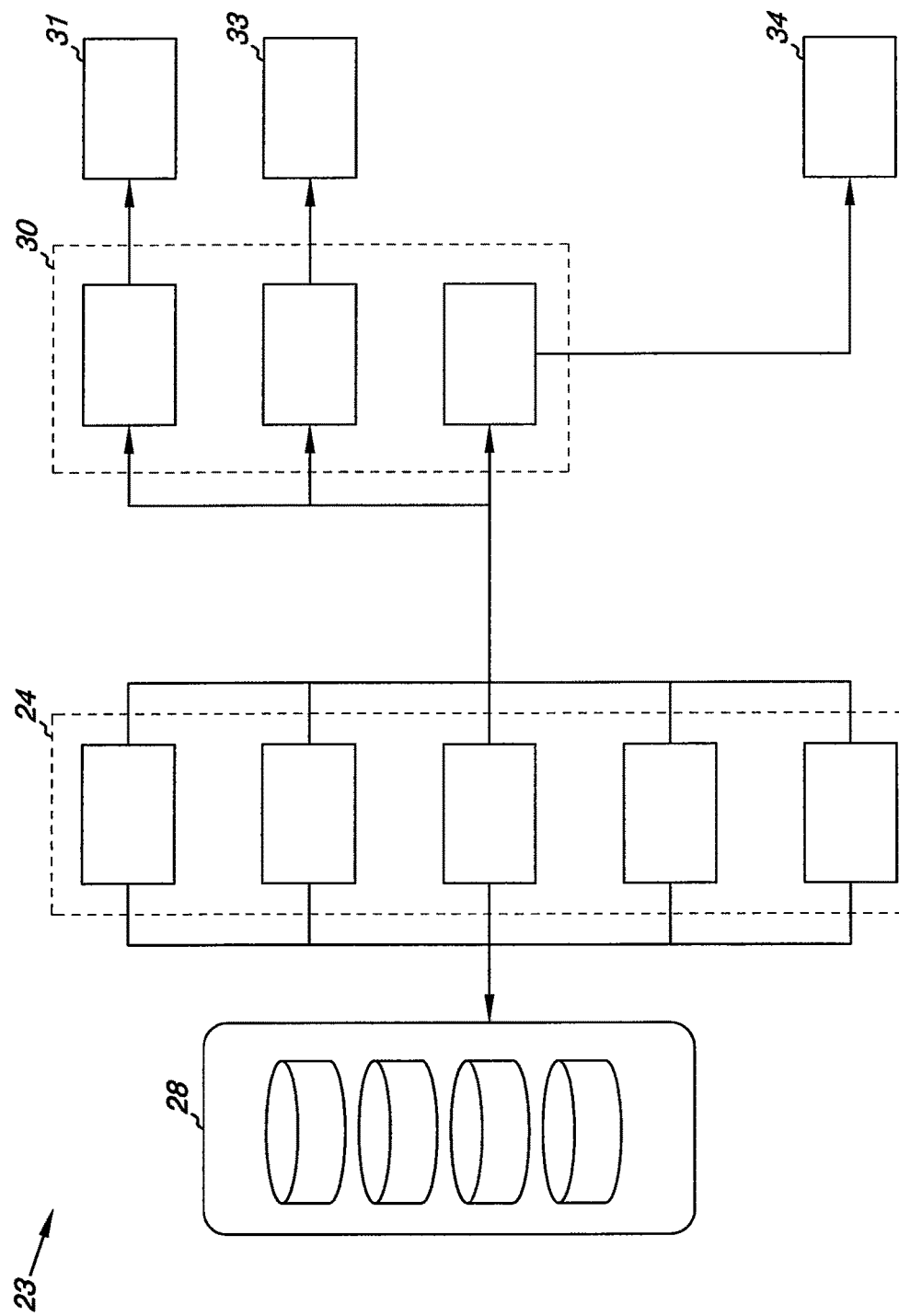

NETWORK-BASED GROCERY STORE

CROSS-REFERENCE TO RELATED APPLICATION

This application is a continuation of U.S. Ser. No. 14/632,410, filed Feb. 26, 2015, issued Sep. 19, 2017 as U.S. Pat. No. 9,767,507 which is a continuation of U.S. Ser. No. 12/508,143, filed Jul. 23, 2009, issued Mar. 3, 2015 as U.S. Pat. No. 8,972,043, which is a continuation of U.S. Ser. No. 10/281,064, filed Oct. 25, 2002, which claims priority from U.S. Provisional Application No. 60/347,950, entitled "Network-Based Grocery Store," by Simon Foster, dated Oct. 25, 2001, the contents of each of which are hereby incorporated in their entirety.

TECHNICAL FIELD

The present invention relates generally to a network-based purchasing system and to an order fulfillment system. More specifically, the present invention relates to an Internet-based system and process for placing and receiving orders for grocery items and to a system for filling the orders and efficiently delivering the orders to customers.

BACKGROUND OF THE INVENTION

Purchase of grocery items over a computer network, such as the Internet, is known in the art. However, the selling of grocery items online presents special logistical problems that often do not pertain to other forms of Internet commerce. These special logistical problems typically revolve around the need for rapid delivery of ordered items and the handling of the mixed variety of goods which are included in a grocery order, including such items as perishable goods, refrigerated goods, and frozen goods.

Customers of an online grocery store typically demand rapid delivery of their orders or delivery within a small time window for convenience. In many cases, delivery is often required within a day from placement of the order. In order to minimize the cost of delivery, yet still satisfy a customer's demand for prompt delivery, the order fulfillment process for these online grocery systems must be significantly more rapid than most E-commerce applications. However, delivery times for many online grocery systems are often limited by their order fulfillment systems and methods. Many of these systems and methods are incapable of satisfying orders within a short period of time. Gathering orders often comprise a major portion of the time expended filling an order. In many of the current systems, orders are filled linearly with each order being filled prior to moving or to the next order. These systems and methods are not optimal in a situation where a large number of orders must be filled within a short period of time.

Another problem faced by current online grocery systems stems from the often mixed bag of goods which typically comprise a grocery order. These orders typically include dry goods, perishable items, items that require refrigeration or freezing, and assorted other goods which may require different gathering or handling techniques. The gathering and delivery of such a mixed bag of items pose a significant logistical problem for most internet-based grocery systems.

The physical delivery of groceries to the customers also often provide additional sources of delay. Delivery areas and routes may vary depending on the particular orders for a given day. The delivery route that a delivery person uses can often significantly affect the delivery time for orders.

As such, there is need for an improved network-based grocery store, which will provide efficient ordering and delivery a grocery items. There is a need in the art for a system and process for efficiently and economically filling orders received over the network. There if a further need for a system and process that allows orders to be delivered rapidly and within a narrow time window to satisfy customer demands.

BRIEF SUMMARY OF THE INVENTION

The present invention, in one embodiment, is a method of fulfilling a network-based product order. The method includes providing product subgroups, each product subgroup having a distinct product subgroup area, separating the network-based product order into subgroup orders based on the product subgroups, and retrieving ordered products from each product subgroup area in an independent parallel fashion.

The present invention, in another embodiment, is a method of retrieving ordered products for a network-based product order. The method includes providing an order label listing the ordered products and scanning the order label. The method also includes providing a plurality of actuable indicators, each indicator being associated with a product, and actuating the indicators associated with the ordered products based on the scanning of the order label. In addition, the method includes locating and retrieving each of the ordered products, placing the ordered products into a carrier, and transporting the carrier to a delivery area.

In a further embodiment, the present invention is a method of retrieving ordered products for a network-based product order. The method includes providing a list of the ordered products, retrieving one of the ordered products, and scanning an area of the one of the ordered products. Further, the method includes providing a plurality of actuable indicators, each indicator being associated with a carrier for a single order, and actuating the indicator associated with the carrier for the single order requiring the one of the ordered products. In addition, the method includes placing the one of the ordered products into the carrier for the single order requiring the one of the ordered products, and transporting the carrier to a delivery area.

The present invention, in an additional embodiment, is a method of fulfilling network-based product orders and delivering ordered products. The method includes creating an order summary based on all received orders, and separating the order summary into subgroup orders based on product subgroups. Further, the method includes retrieving products from each of the product subgroups in an independent parallel fashion, combining the products into delivery packages based on the received orders, and delivering the delivery packages.

The present invention, in another embodiment, is a fulfillment hub for fulfilling a network-based product order. The fulfillment hub has at least two subgroup areas, each subgroup area designated for a particular type of product, and a delivery area positioned to facilitate transportation of products between the delivery area and the at least two subgroup areas.

The present invention, in a further embodiment, is a network-based grocery store process for receiving, filling, and delivering grocery items, the items located in a plurality of predefined gathering sites. The process includes grouping items in an order based on their respective gathering site, concurrently gathering items in an order at their respective gathering site, and reassembling the order at a distribution point.

A further embodiment of the present invention is a method of supplying grocery items over a computer network. The method includes providing a website in communication over the computer network with an order receiving interface. Further, the method includes placing each order into at least one subgroup, gathering items in each subgroup in parallel, reassembling the items gathered for each subgroup of an order to form a complete order, and delivering the order.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2C is a schematic diagram of hardware components of an order fulfillment system, according to one embodiment of the present invention.

DETAILED DESCRIPTION

Figures 1, 2A:
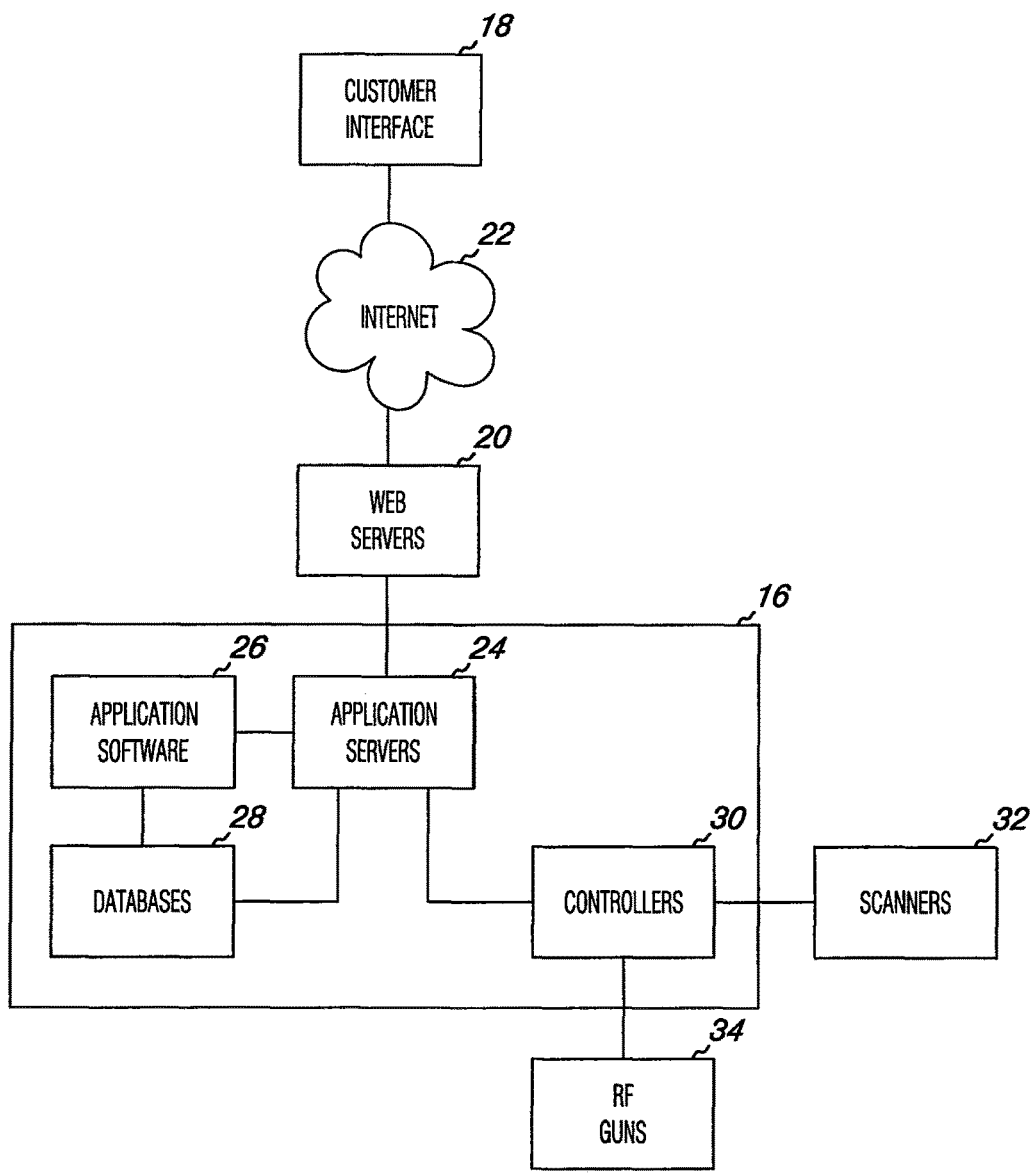
FIG. 1 is a flow diagram of a method of operating a network-based grocery store, according to one embodiment of the present invention.
FIG. 2A is a schematic diagram of hardware components of a network-based grocery store, according to one embodiment of the present invention.

FIG. 1 shows the steps involved in one embodiment of a network-based grocery store of the present invention. Generally, the invention includes order placement (block 10) by a customer on a network, order fulfillment (block 12) of the ordered products in an efficient manner, and timely delivery (block 14) of the ordered products to the customer. The system provides an economical and efficient method of providing products to a customer without requiring the customer to go to a store. The system also provides a method for the provider of products to more economically and efficiently fulfill customer orders. The present invention also encompasses any system that can be used as a network-based store to satisfy any commercial needs of a consumer.

The present invention is a network-based system for ordering, fulfilling, and delivering products. In one aspect of the invention, the system is Internet-based. FIG. 2A shows the architecture of an Internet-based system according to one embodiment of the present invention. The system includes a server 16 in communication with a customer interface 18 over the Internet 22. According to one embodiment, the customer interface 18 is a website hosted by a plurality of web servers 20. The server 16 includes application servers 24 that include application software 26, databases 28, and controllers 30. The controllers 30 are connected to external devices such as scanners 32 or radio frequency ("RF") guns 34.

Figure 2B:
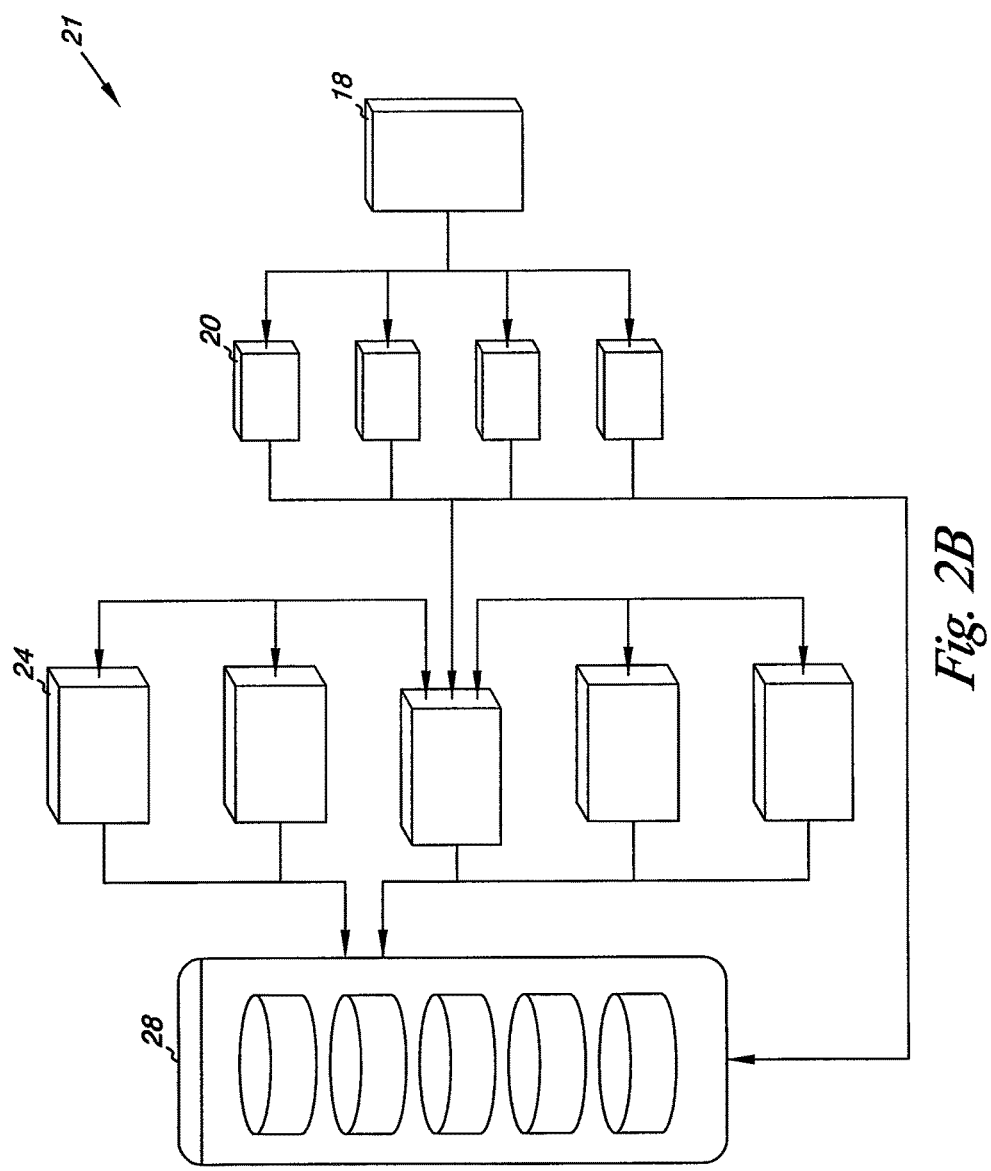
FIG. 2B is a schematic diagram of hardware components of an order processing system, according to one embodiment of the present invention.

In an alternative embodiment, the network-based system of the present invention may include an order processing system 21 and an order fulfillment system 23. FIG. 2B shows an order processing system according to one embodiment of the present invention. Application servers 24 communicate with a customer interface 18 over web servers 20. The application servers 24 are also in communication with databases 28.

FIG. 2C shows an order fulfillment system 23 according to one embodiment of the present invention. Application servers 24 communicate with databases 28 and controllers 30. The controllers 30 drive scanning systems 31, RF guns 34, and product retrieval systems 33. The product retrieval systems 33 may be any known system designed for efficient and economic retrieval of products in a warehouse environment.

In operation, order placement 10 can be performed by a customer at the customer interface 18. For instance, in one embodiment of the present invention, the customer places the order through his/her personal computer by accessing the customer interface at a specified website. Product selection and availability information is provided to the customer interface 18 from the databases 28 and application servers 24. Once a customer places an order at the interface 18, the order is transmitted to the server 16 via the Internet 22. Alternatively, the order can be transmitted to the server 16 over any computer network. The application servers 24, with the assistance of the application software 26, the databases 28, the controllers 30, and such external devices as scanners 32 and RF guns 34, use the order information to fulfill the order 12 and deliver 14 the ordered products to the customer.

Figure 3:
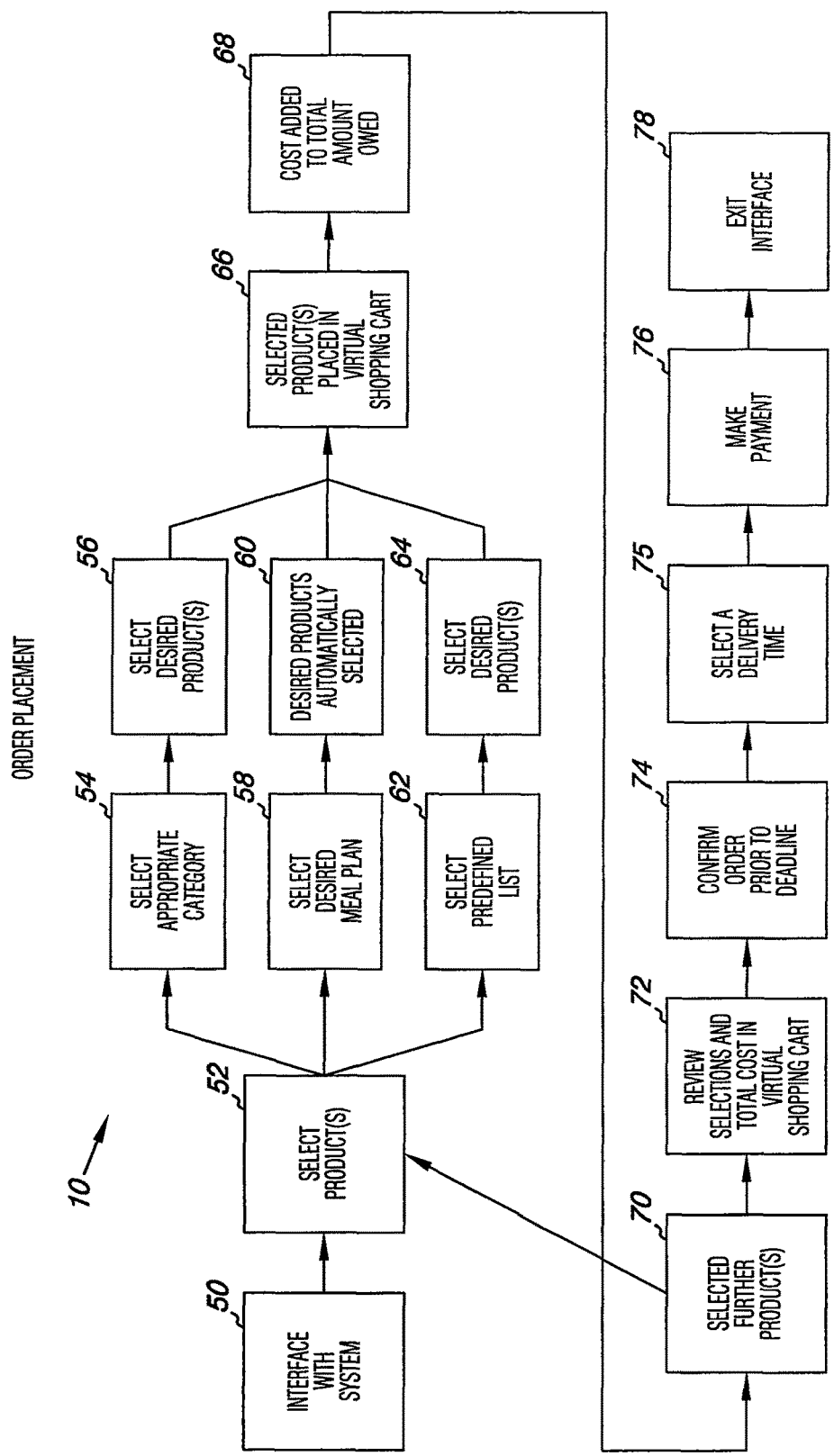
FIG. 3 is a flow diagram of a method of order placement, according to one embodiment of the present invention.

A customer uses the customer interface 18 to place an order for a product or products desired by the customer. FIG. 3 shows a method of order placement 10 according to one embodiment of the present invention. To place an order, a customer interfaces with the system (block 50). In one embodiment similar to that depicted in FIG. 2, the customer uses a computer to interface with the system (block 50) at a website. Alternatively, the customer interfaces with the system (block 50) using any known network. At the interface 18, the customer selects a product (block 52).

The customer can select products (block 52) in at least three different ways. In one embodiment, product selection (block 52) involves the customer selecting an appropriate category (block 54) and then selecting the desired product (block 56). The system of the present invention provides a variety of product categories for the customer's selection similar to the categories found in a typical brick-and-mortar grocery store. Such categories include produce, frozen goods, dairy, and other similar categories. Based on the desired product, the customer selects the appropriate category (block 54). The category selection (block 54) prompts the system of the present invention to provide a list of products available in that category. The customer then selects a desired product or products (block 56) from that category list.

Alternatively, product selection (block 52) involves selecting a desired meal plan (block 58). The present invention provides predetermined meal plans consisting of all the ingredients necessary to prepare a desired meal. As an example, a desired meal may consist of a ribeye steak, a baked potato, and mixed vegetables. The predetermined meal plan would provide all the necessary grocery products to create the desired meal, including the steak, potatoes, mixed vegetables, and any other ingredients necessary for preparation of the meal. Upon selection of the desired meal plan (block 58) by the customer, the desired products required to prepare the meal are automatically selected (block 60) by the system of the present invention. The meal plan feature of the present invention provides a fast and easy way for a customer to order all the ingredients for a desired meal without having to select each product separately.

In a further aspect of the present invention, product selection (block 52) involves selecting products from one of several predefined lists of products. The predefined list may be preprogrammed with products by the customer for repeated use. Alternatively, the predefined list may include products previously ordered by the customer. In operation, the customer first selects a predefined list (block 62). The customer then selects the desired product or products (block 64) from the list.

Also, the customer may be provided with all three methods of product selection, wherein the customer may use one or more of the methods to select products.

After product selection (blocks 52, 56, 60, or 64), a list of the selected products according to one embodiment are placed in a virtual shopping cart (block 66) by the system of the present invention. Further, the cost of the selected product is added to the total amount owed (block 68) for the customer's entire order. The total amount owed can be displayed in the virtual shopping cart. The virtual shopping cart can be accessed via the customer interface 18 and provides summary order information such as a summary of selected products and a total amount owed based on the cost of the selected products.

The customer can select further products (block 70). That is, the system of the present invention allows the customer to select further products (block 70) via the customer interface 18 using the methods described above. Once product selection (blocks 52, 70) is complete, the customer can review the selections and the total cost in the virtual shopping cart (block 72) and confirm the order prior to the predetermined deadline (block 74). In one embodiment, the customer confirms the order by selecting the "Check Out" button on the virtual shopping cart, triggering the system of the present invention to transfer the order from the virtual shopping cart for processing.

In one aspect of the present invention, the system establishes a periodic deadline for submitting an order to ensure delivery at a scheduled delivery time. Having a predetermined deadline allows the system to process and analyze each order and provide for efficient and economical fulfillment and delivery of each order. The deadline for delivery on a following day is 11:00 p.m. Alternatively, the deadline is any time established as the appropriate cut-off for receiving orders in a manner that allows the system to successfully fulfill and deliver the order in a feasible manner mutually beneficial for the customer and the system of the present invention.

In one embodiment, the customer can also perform delivery planning, including selection of a delivery time (block 75). By allotting discrete delivery times to each customer, the system of the present invention can enhance the efficiency, economy, and accommodation of the delivery of products to the customer. Before exiting, the customer can make payment (block 76) for the entire order. Payment is made by credit card. Alternatively, payment is made by any known method for paying for products purchased via a network-based store. After making payment (block 76), the customer exits the customer interface (block 78).

In a further embodiment, the customer interface also provides additional services such as meal planning and customer enrollment by known methods.

Figure 4:
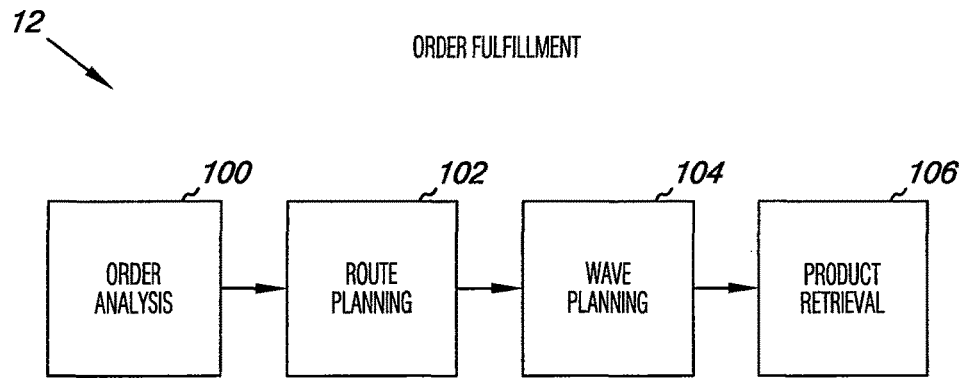
FIG. 4 is a flow diagram of a method of order fulfillment, according to one embodiment of the present invention.

After the customer has placed an order, the system of the present invention provides for fulfilling that order in an efficient and economical manner. FIG. 4 shows a method of order fulfillment 10 according to one embodiment of the present invention. To fulfill an order placed by a customer, there may be an order analysis (block 100) by the system. Once all orders for an ordering period have been analyzed, route planning (block 102) and wave planning (block 104) steps may be performed to anticipate the delivery and capacity limitations that determine the timing and other requirements for the product retrieval (block 106) step. Alternatively, the order analysis (block 100) and route and wave planning steps (blocks 102, 104) may be combined or performed in any order to assure that the system has the capacity and capabilities to fulfill every order. Product retrieval (block 106) is a method of assimilating the product or products ordered by the customer.

Figure 5:
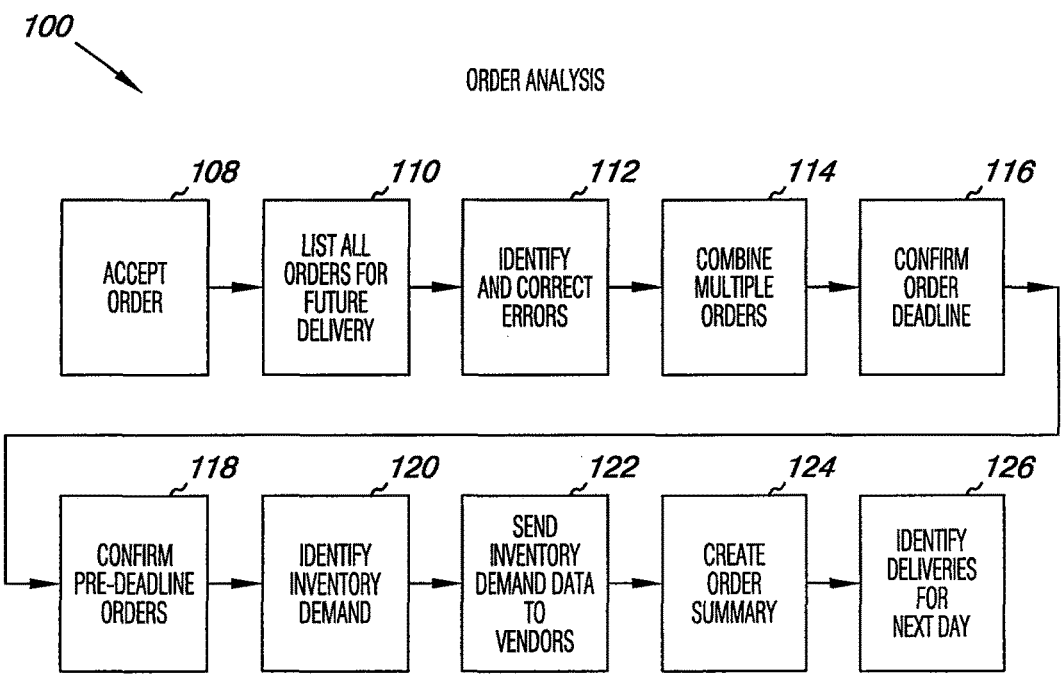
FIG. 5 is a flow diagram of a method of order analysis, according to one embodiment of the present invention.

Once an order is received by the system of the present invention, the order may be analyzed before the products requested in the order are retrieved. FIG. 5 shows a method of order analysis 100 according to one embodiment of the present invention. After the order is accepted (block 108) by the system, all orders for future delivery (e.g., for delivery on a particular day or at a particular time) are compiled and listed (block 110). Once compiled into a list, the orders may be examined for identification and correction of errors (block 112). In one aspect of the invention, an error is related to unusual or erroneous delivery dates. Alternatively, the errors may be related to duplicate orders. If it is further determined that a customer has submitted more than one order, the multiple orders may be combined (block 114).

Once all error corrections (block 112) and multiple order combinations (block 114) have been completed, one embodiment of the present invention calls for confirming the order deadline (block 116) and confirming the pre-deadline orders (block 118). By order deadline confirmation (block 116) and pre-deadline order confirmation (block 118), the system of the present invention distinguishes orders that qualify for delivery the next day from orders that do not and separates the orders. Qualifying orders are considered in identifying inventory demand (block 120) and creating a shopping list (block 124), while orders that were not submitted prior to the deadline are not. In one embodiment, the non-qualifying orders become qualifying orders during the next appropriate period and are fulfilled and delivered during that period. Alternatively, the non-qualifying orders are saved for fulfillment and delivery in a later period. As discussed above, the system of the present invention identifies inventory demand (block 120) based on order requests to be fulfilled in the following delivery period. Once the demand is identified, the inventory demand data is sent to the vendors (block 122). According to one embodiment, the vendors use the data to supply further inventory, thus ensuring that the system has a sufficient supply of products to satisfy the customer demand and fulfill all future orders. After confirmation, an order summary is created (block 124) and all deliveries for the next day are identified (block 126) as necessary steps in preparation for fulfillment.

Figure 6:
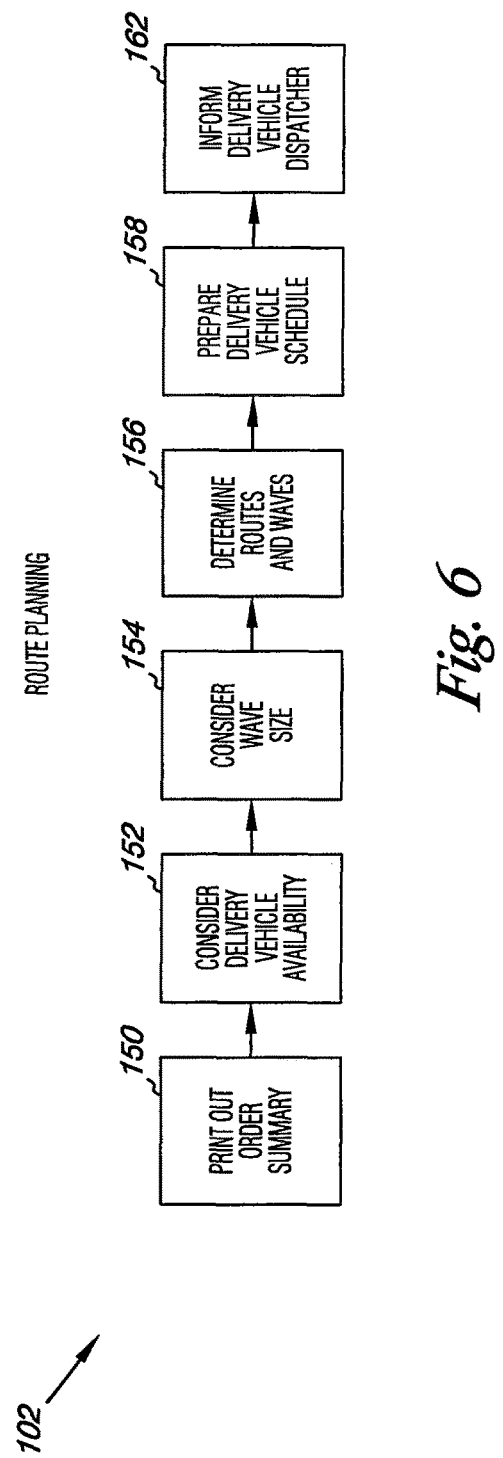
FIG. 6 is a flow diagram of a method of route planning, according to one embodiment of the present invention.

During order fulfillment, the system of the present invention also provides for planning delivery routes. FIG. 6 shows a method of route planning 102 according to one embodiment of the present invention. By anticipating and planning for the delivery routes that will be needed to deliver every order during the delivery period, the system determines the requirements for fulfillment. After an order summary is printed out (block 150) for review and delivery vehicle availability (block 152) and wave size (block 154) are considered, the routes and waves are determined (block 156). A wave is a pre-planned time period wherein gathering of items for a pre-planned number of orders is undertaken. A wave is determined based on requested delivery times and fulfillment capacity. By determining the waves necessary to fulfill the orders and the availability of delivery vehicles, the delivery routes can be established. Using the route information, a delivery vehicle schedule is prepared (block 158) and a delivery vehicle dispatcher is informed of the schedule (block 160).

Figure 7:
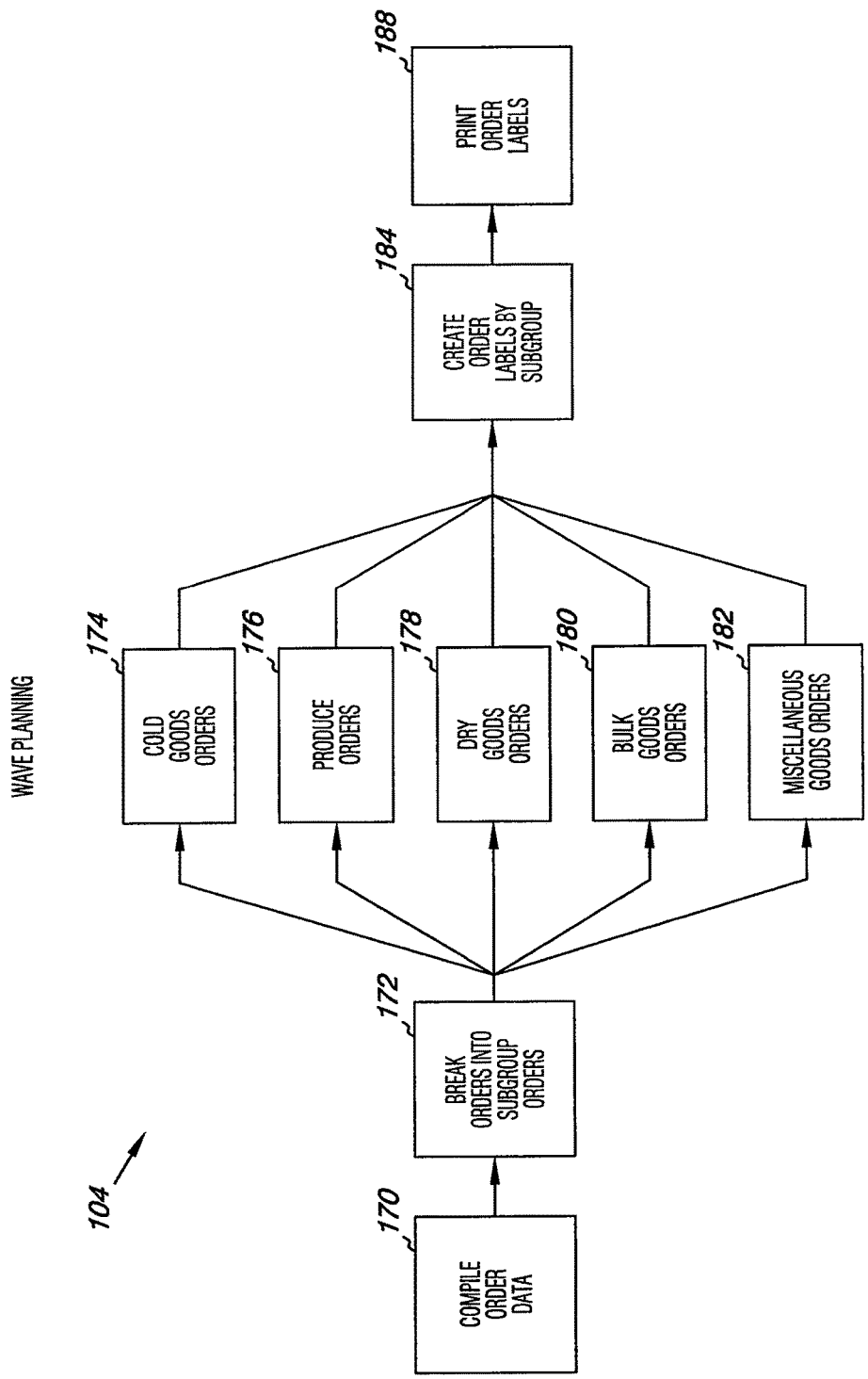
FIG. 7 is a flow diagram of a method of wave planning, according to one embodiment of the present invention.

Wave planning is another aspect of order fulfillment. FIG. 7 shows a method of wave planning block 104 for order fulfillment 12 according to one embodiment of the present invention. After compiling the order data (block 170), the orders are broken into subgroup orders (block 172). Subgroup orders are based on product subgroups, which are determined based on product type. In one aspect of the present invention, subgroups include cold goods, produce, dry goods, bulk goods, and miscellaneous goods. The products are divided up into subgroups in the present invention because product fulfillment can be completed more economically and efficiently when the products are located in different areas based on subgroups during the fulfillment process. Cold goods include products requiring freezing or refrigeration. Dry goods are non-cold, non-produce goods such as bakery items, packaged goods, beverages, infant care products, and household goods. Bulk goods are generally larger quantities or sizes of dry goods (e.g., 24-packs of soda cans, bags of dog food, etc.).

Based on the subgroups defined above, the requested products from all qualifying orders are broken into subgroup orders (block 172) that include cold goods orders (block 174), produce orders (block 176), dry goods orders (block 178), bulk goods orders (block 180), and miscellaneous goods orders (block 182). Once the subgroup orders are determined, order labels based on subgroups are created (block 184) based on the product quantities in the subgroup orders and then printed (block 188). The system of the present invention uses the order labels to provide for efficient product retrieval and track product fulfillment.

Figure 8:
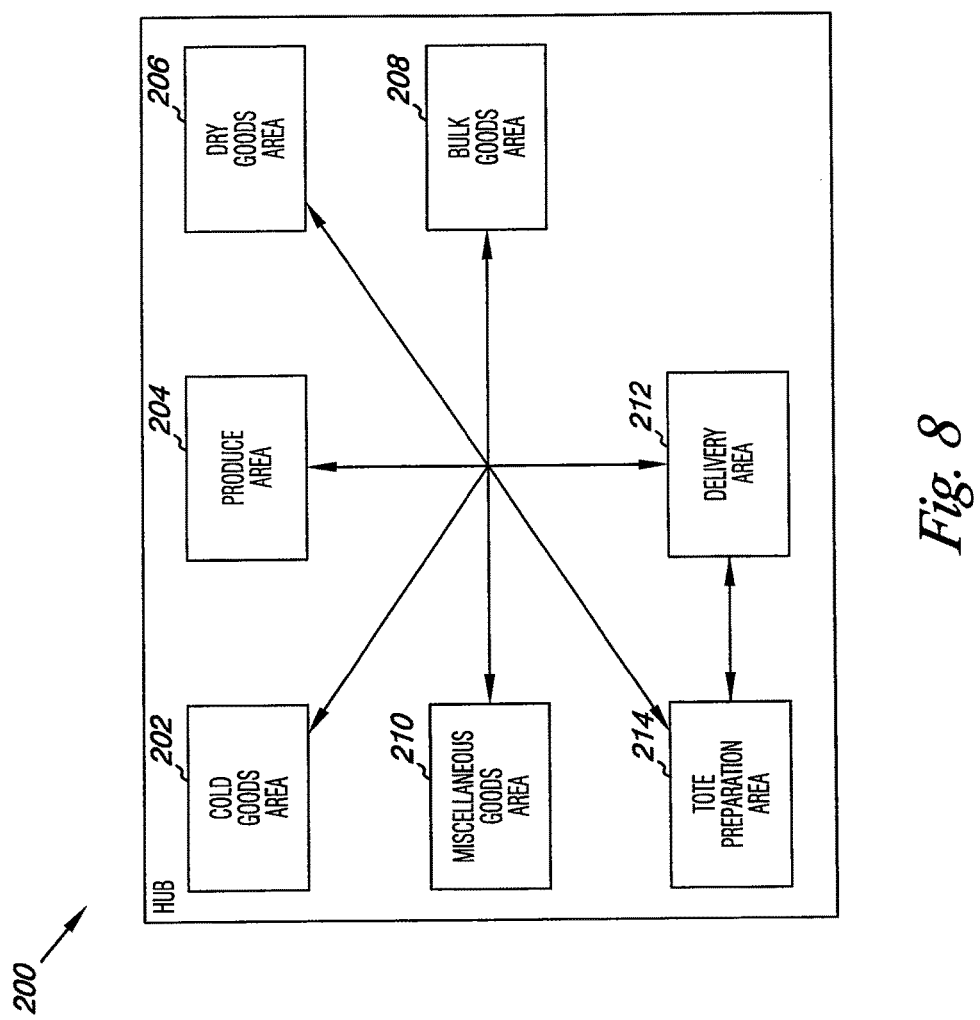
FIG. 8 is a schematic diagram of a fulfillment hub, according to one embodiment of the present invention.

The system of the present invention includes a fulfillment hub designed to allow for efficient product fulfillment. FIG. 8 depicts a fulfillment hub 200 according to one aspect of the present invention. A fulfillment hub 200, or warehouse facility, provides subgroup area organization that enhances the efficiency and economy of the system of the present invention. Each subgroup area is a separate area providing for separate product retrieval independent of product retrieval in each of the other subgroup areas. In one embodiment, the hub 200 includes a delivery area 212 from which all orders are subsequently delivered to the customer. The products are collected from one or more of several subgroup areas prior to transport to the delivery area 212. The subgroup areas include the cold goods area 202, the produce area 204, the dry goods area 206, the bulk goods area 208, and the miscellaneous goods area 210. Totes are prepared in the tote preparation area 214 and transported from the prep area 214 to the appropriate subgroup area. Alternative embodiments of the hub 200 may include additional subgroup areas depending on the products being marketed. For example, there may be a separate freezer goods area for freezer goods. The hub 200 provides a spatial organization conducive to generally parallel product retrieval as described below.

Figure 9:
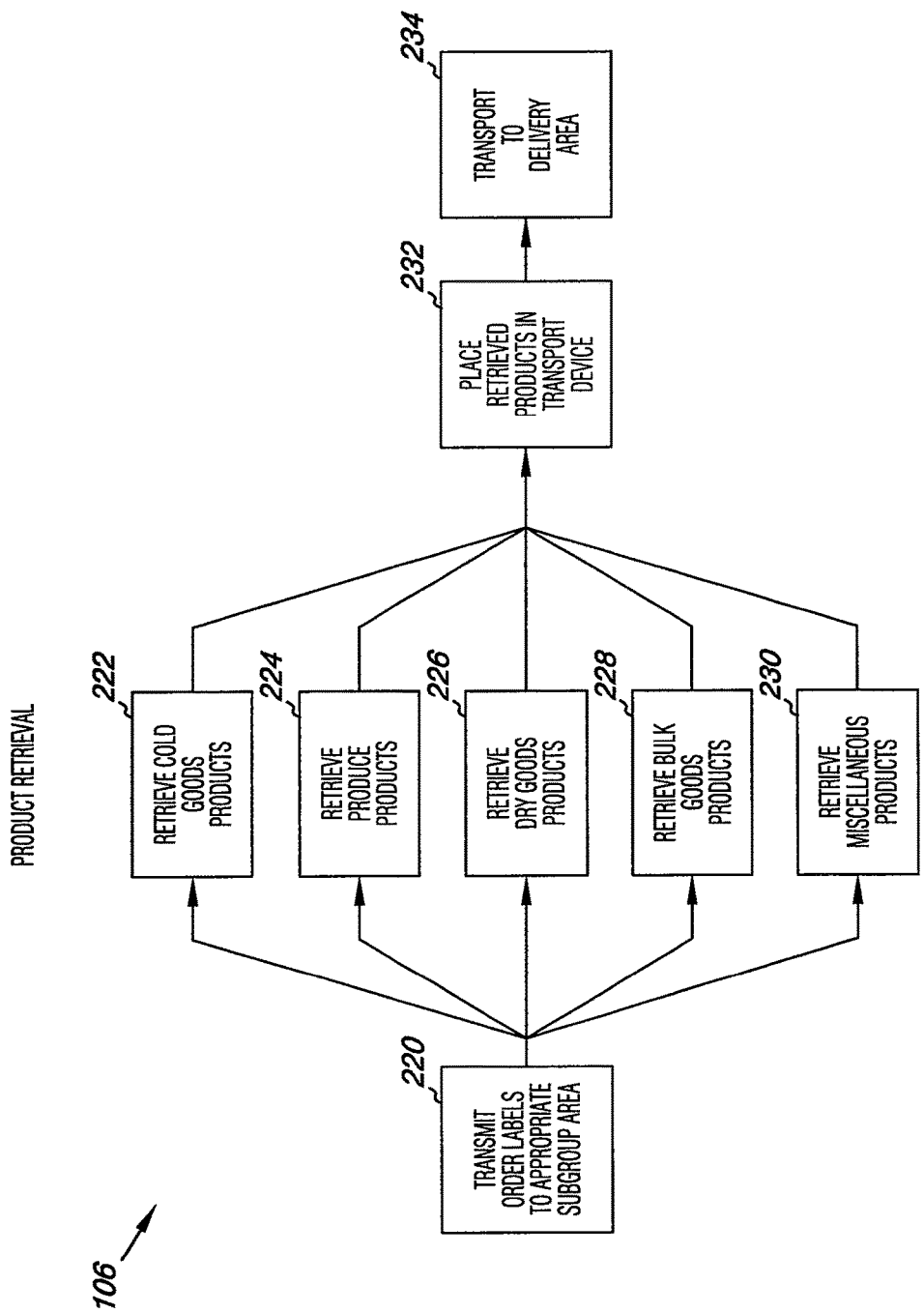
FIG. 9 is a flow diagram of a method of product retrieval, according to one embodiment of the present invention.

After an order has been received, analyzed, and routes and waves have been planned, the ordered products must be retrieved. FIG. 9 shows an organized and efficient method of product retrieval 106 according to one embodiment of the present invention. Product retrieval 106 can be performed in a generally parallel fashion in a hub 200 similar to that depicted in FIG. 8. That is, products are retrieved from various subgroup areas during the same general time period or in a fashion such that retrieval of products at one subgroup area is independent of retrieval of products at other subgroup areas. This parallel retrieval promotes efficiency and speed. To perform product retrieval 106 in parallel, all order labels are first transmitted to appropriate subgroup areas (block 220). Alternatively, orders are divided into lists of subgroup products and sent to the designated subgroup areas for retrieval by any method allowing for separation by subgroup products and efficient transfer of that information to the appropriate areas. Parallel retrieval includes retrieving cold goods products (block 222), produce products (block 224), dry goods products (block 226), bulk goods products (block 228), and miscellaneous products (block 230) at generally the same time or in a fashion independent of each other. During retrieval, the retrieved products are placed in a transport device (block 232) and transported to the delivery area (block 234). In one aspect of the invention, the retrieved products are placed in a tote which is transported to the subgroup area from the tote preparation area 214. The retrieved products may also be placed in a cart. Alternatively, the retrieved products are placed in any known transport device capable of moving products in a warehouse setting.

Figure 10:
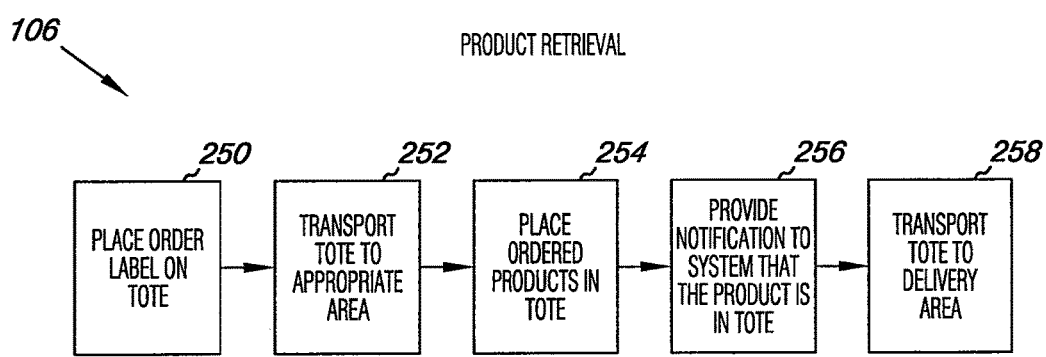
FIG. 10 is a flow diagram of another method of product retrieval, according to one embodiment of the present invention.

Each subgroup can have the same or different retrieval procedures in the system of the present invention. FIG. 10 shows a product retrieval method 106 for one subgroup according to one embodiment of the present invention. Product retrieval 106 from one subgroup of products includes placing an order label on a tote (block 250) and transporting the tote from the tote preparation area to the appropriate subgroup area (block 252). Alternatively, any known transport device for transporting products in a warehouse setting may be used. In a further aspect of the invention, the label may be placed on the tote at the subgroup area. At the subgroup area, the ordered products are retrieved and placed in the tote (block 254). Notification is provided to the system that the product is in the tote (block 256). In one aspect of the present invention, notification is provided to the system by scanning the item using a bar code scanner 32 connected to the system of the present invention. In one aspect of the invention, the bar code scanner 32 is a cordless bar code scanner using linear imaging technology. For example, the scanner may be the 3870 Welch Allyn™ cordless scanner. The scanner is used to read the bar code on the order label that may be attached to the tote. Alternatively, the system is notified that the ordered product is in the tote (block 256) by any other known method for inputting information into a network system. In some embodiments, known computer systems may be integrated into the system of the present invention for product retrieval. For example, some embodiments include Pick to Light Systems™ by Professional Control Corp™. When all the products have been retrieved from the appropriate subgroup area, the tote is transported to the delivery area (block 258).

Figure 11A:
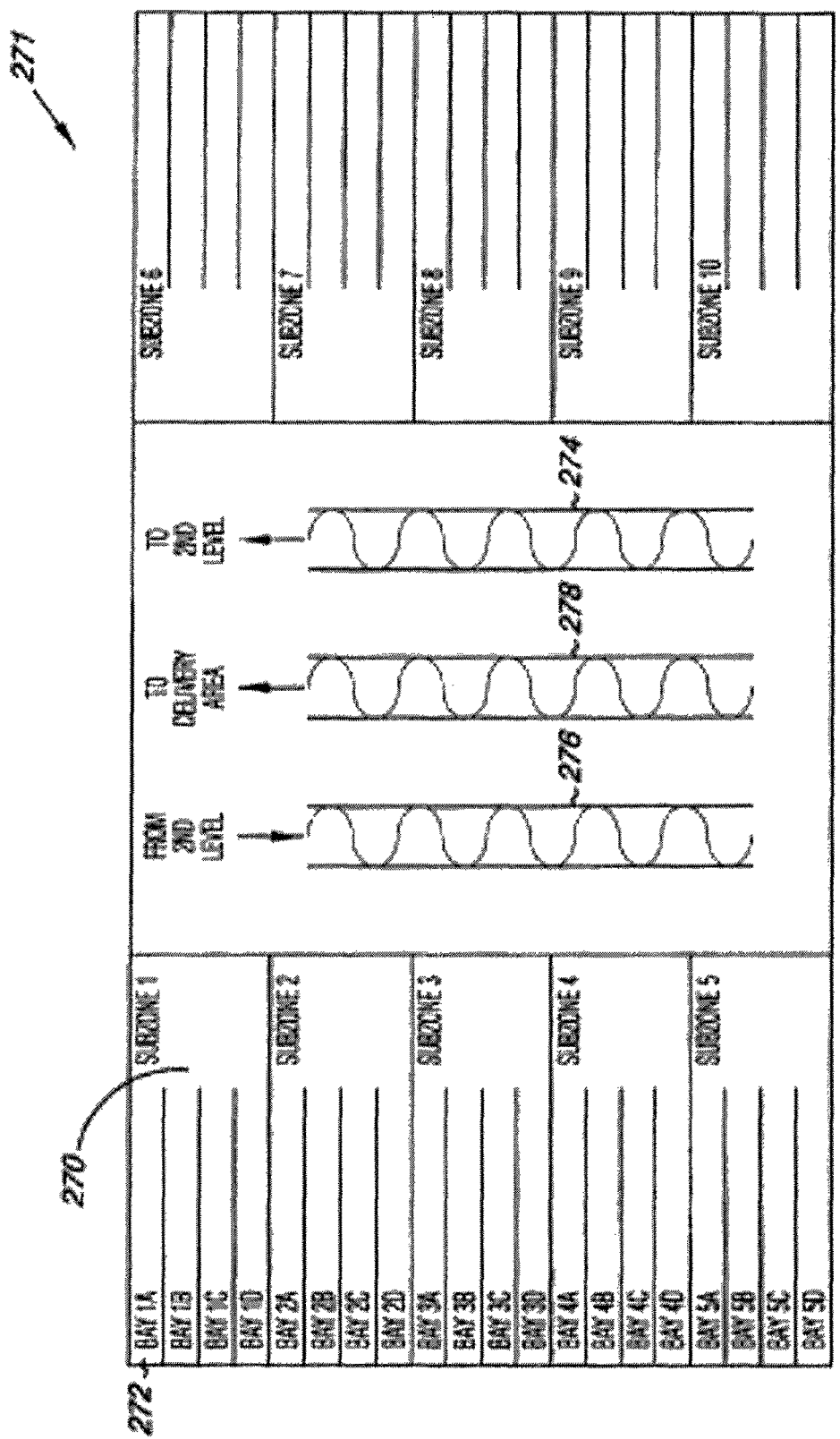
FIG. 11A is a schematic diagram of a cooler zone in a cold goods area, according to one embodiment of the present invention.
Figure 11B:
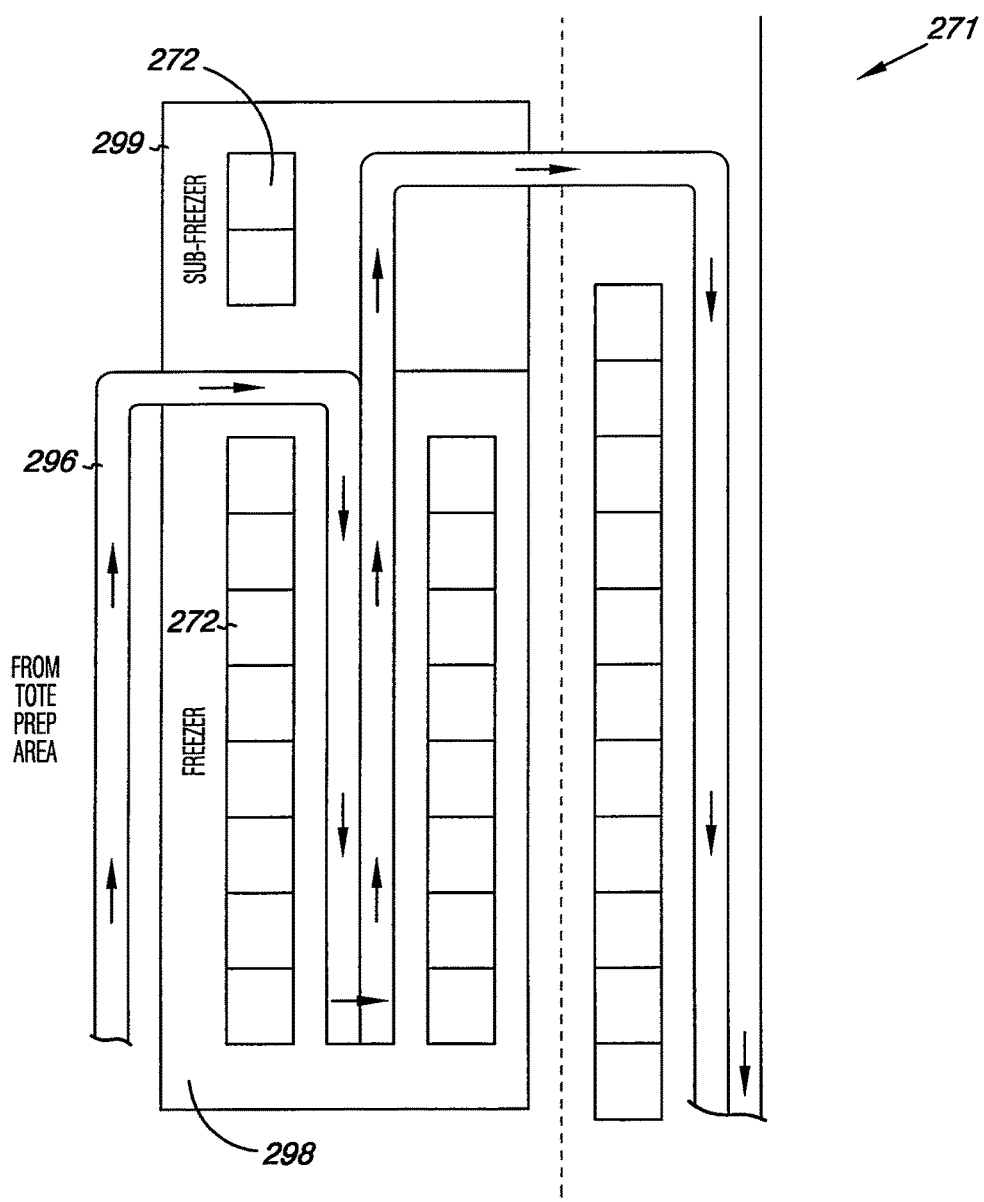
FIG. 11B is a schematic diagram of a freezer zone and sub-freezer zone in a cold goods area, according to one embodiment of the present invention.

Like the retrieval methods, the subgroup areas of the system of the present invention can be identical or differ based on the limitations and needs associated with the subgroup products. One subgroup area according to one aspect of the present invention is a cold goods area 202 as depicted in FIGS. 11A and 11B, which is divided into three zones: a cooler zone 271, a freezer zone 298, and a sub-freezer zone 299. Alternatively, the cold goods area can consist of a single zone, any variation of the three zones, or four or more zones, each configured to provide an appropriate environment for the products contained in the zone.

FIG. 11A shows a first level of a three-level cooler zone 271 according to one embodiment of the present invention. The cooler zone 271 is designed to hold products that must be maintained in a cold, but not frozen, environment. Such products may include milk, orange juice, etc. In one embodiment, the cooler zone 271 is maintained at 34°Fahrenheit. Alternatively, the cooler zone 271 may be maintained at any temperature above freezing that allows products to remain cold.

The cooler zone 271 may have any number of subzones 270 and bays 272. In FIG. 11A, the zone 271 is depicted as having ten subzones 270, each subzone containing four bays 272. Alternatively, the cooler zone 271 can have anywhere from one subzone 270 to a substantially greater number of subzones 270, with each subzone 270 containing from one to several bays 272. In a further alternative, the cooler zone 271 can have one or more levels.

The cooler zone 271 depicted in FIG. 11A has three conveyor belts to transport the totes. One conveyor belt 274 transports totes from the first level to a second level of the cooler zone 271. A second conveyor belt 276 transports totes from the second level to the first level. A third conveyor belt 278 transports totes containing ordered products to the delivery area 212. According to one aspect of the invention, additional conveyor belts transport totes from the second level to the third level and vice versa. Alternatively, if the cooler zone 271 has more than three levels, there are additional conveyor belts to transport totes between each level and to the delivery area 212. While the embodiment depicted in FIG. 11 is intended as a cooler zone 271 in a cold goods area 202, it should be understood that further embodiments of the zone 271 could be used to store and retrieve any type of products.

FIG. 11B shows a freezer zone 298 and a sub-freezer zone 299 of a cold goods area 202 according to one embodiment of the present invention. The freezer zone 298 maintains a temperature below freezing for products that must remain frozen. In one aspect of the invention, the freezer zone maintains a temperature of 0°Fahrenheit. The sub-freezer zone 299 maintains a temperature colder than the freezer zone 298 for any products that require such a temperatures. Such products may include those that must be cold enough to remain frozen for a significant period of time after removal from the sub-freezer zone 299, such as ice cream. In one embodiment, the sub-freezer zone 299 maintains a temperature of minus 15°Fahrenheit.

The freezer zone 298 and the sub-freezer zone 299 each has any number of bays 272. In an alternative embodiment, either or both zones 298, 299 have any number of subzones 270 containing any number of bays 272. In a further aspect of the invention, the freezer zone 298 and the sub-freezer zone 299 can have more than one level.

A conveyor belt 296 depicted in FIG. 11B transports totes into, through, and out of the freezer zone 298 and the sub-freezer zone 299 in one embodiment of the present invention. Alternatively, the system of the present invention may provide for more than one conveyor belt in the freezer zone 298 or the sub-freezer zone 299. The conveyor belt brings empty totes from the tote preparation area 214. Alternatively, the totes are transported to the cold goods area 202 by any known method of transporting carrier devices in a warehouse setting. In the freezer zone 298, the conveyor belt 296 travels past every bay 272 to ensure that each tote on the belt is accessible from every bay 272. In the embodiment depicted in FIG. 11B, there are bays 272 lining opposite walls of the freezer zone 298. The conveyor belt 296 travels between both rows of bays 272. The belt 296 passes next to the bays 272 on one wall, turns around at the opposite end, and passes next to the bays 272 on the opposite wall before exiting the freezer zone 298. Alternatively, the conveyor belt 296 can travel through the freezer zone in any fashion that provides accessibility to the totes from every bay 272.

The conveyor belt 296 also passes next to the bays 272 in the sub-freezer zone 299, according to one embodiment of the invention. As with the freezer zone 298, the system requires that the conveyor belt 296 pass next to the bays 272 in the sub-freezer zone 299 in a manner providing easy access to the totes on the conveyor belt 296 from the bays 272. The conveyor belt 296 then enters the third level of the cooler zone 271. Alternatively, the conveyor belt exits the cold goods area 202 and transports the totes to another subgroup area or the delivery area 212. In a further alternative, the totes are removed from the conveyor belt 296 for transport to another area.

Figure 12:
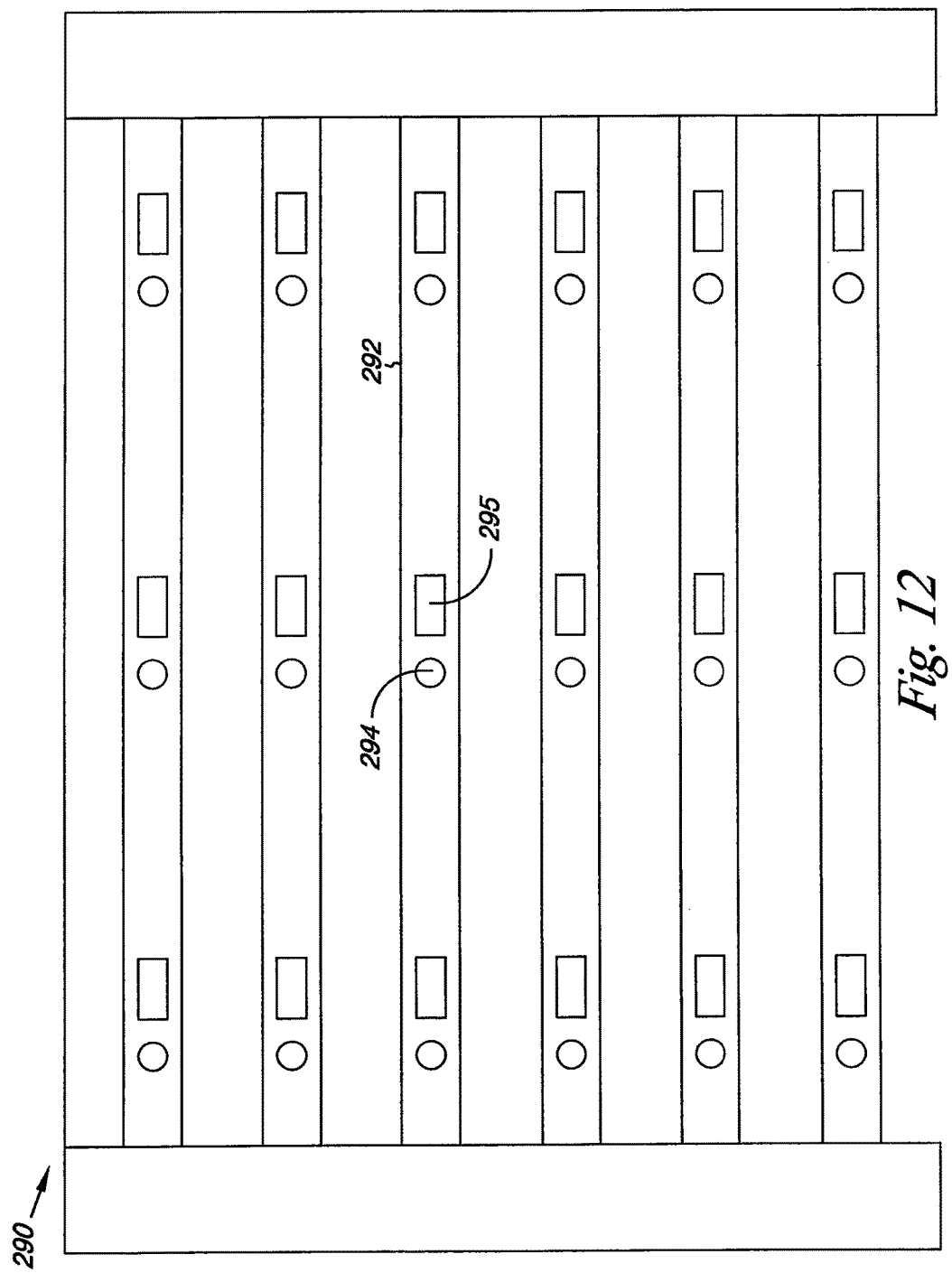
FIG. 12 is a schematic diagram of a shelving system in a cold goods area, according to one embodiment of the present invention.

FIG. 12 shows a shelving system 290 for use in a cold goods area bay 272 in the cooler zone 271, the freezer zone 298, or the sub-freezer zone 299 according to one embodiment of the present invention. The shelving system 290 has several shelves 292 stacked vertically. Alternatively, the shelving system 290 in the bay 272 is comprised of more than two shelves 292 stacked vertically on top of each other. The bay 272 has shelves 292 on two sides of the bay 272 for easy retrieval of products. Alternatively, the bay may have shelves on one or more than two sides of the bay 272. In a further aspect of the present invention, the bays 272 have any other common device for storing products. The shelving system 290 includes a plurality of identification buttons 294 positioned with respect to the products for retrieval. That is, each product has a designated area on a particular shelf 292 and a corresponding identification button 294 in close proximity with the designated area. In one embodiment, the shelving system 290 also has a plurality of displays 295, one display 295 associated with identification button 294.

Figure 13:
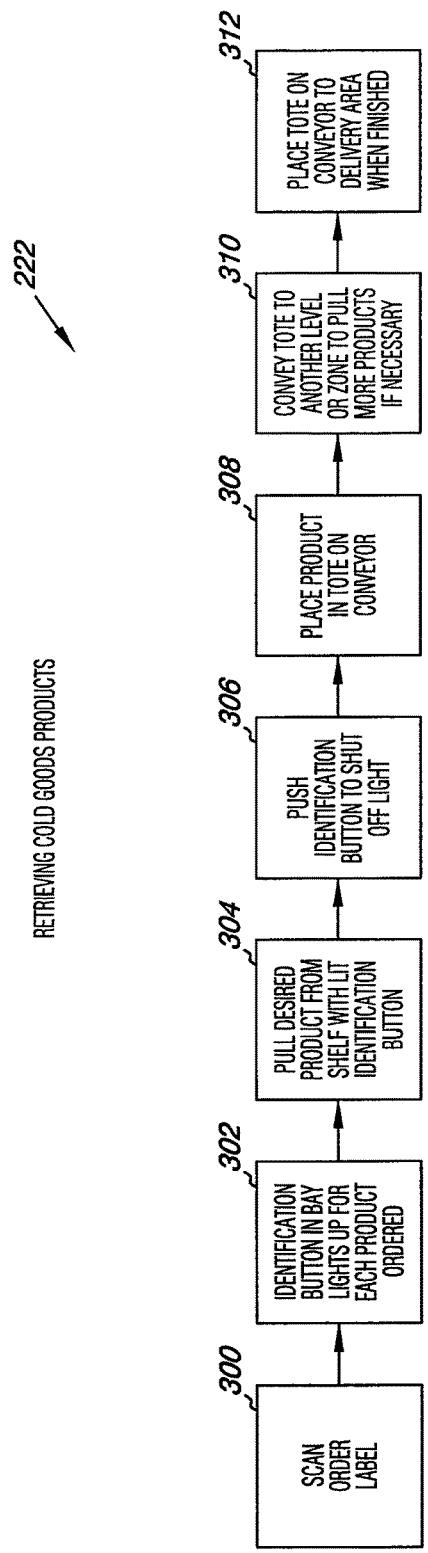
FIG. 13 is a flow diagram of a method of retrieving cold goods products, according to one embodiment of the present invention.

The cold goods area is designed to enhance the efficiency and economy of cold goods retrieval. FIG. 13 shows a method of retrieving cold goods products 222 from a cold goods area 202 (such as depicted in FIGS. 11A and 11B) according to one embodiment of the present invention. To determine which products must be retrieved for an order, the order label is scanned (block 300). According to one embodiment, the order labels are first attached to a tote which is transported to the cold goods area by a forklift from the tote preparation area 214. In a further embodiment, the totes are transported from the tote preparation area 214 to the cold goods area 202 by a conveyor belt. Alternatively, a tote is transported manually or by any other known method for transporting a carrier device in a warehouse setting from the tote preparation area 214 or from any of the other subgroup areas.

Upon scanning the order label (block 300), the system recognizes the ordered products to be retrieved and identifies those products in the bay with identification buttons 294. That is, the system of the present invention causes identification buttons 294 in the appropriate bay or bays 272 to light up for each product ordered (block 302). Alternatively, the ordered products can be identified using any known indicator that can be actuated to draw attention to a location. Upon identification of the ordered products with the identification buttons 294, the system allows for each ordered product to be pulled from the shelf 292 with the lit identification button (block 304). In one embodiment, the display 295 provides the required number of the ordered product when the order calls for more than one units of the same product. The system of the present invention therefore provides for pulling the appropriate number of units of one product from the shelf 292 based on the number of units shown on the display 295. Upon pulling the product, the identification button 294 is pushed to shut the light off and to indicate that the ordered product has been pulled from the shelf 292 and placed in the tote (block 308). The tote containing the retrieved products is conveyed, according to one embodiment, to any additional level or zone to retrieve more products as necessary (block 310). Alternatively, if the order has already been filled, the tote need not be conveyed to any additional level or zone. Finally, the tote is placed on the conveyor for transport to the delivery area (block 312) when every product in the subgroup order has been retrieved. Alternatively, the tote is transported to another subgroup area. It should be understood that further embodiments of this method could be used to retrieve any type of products.

Figure 14:
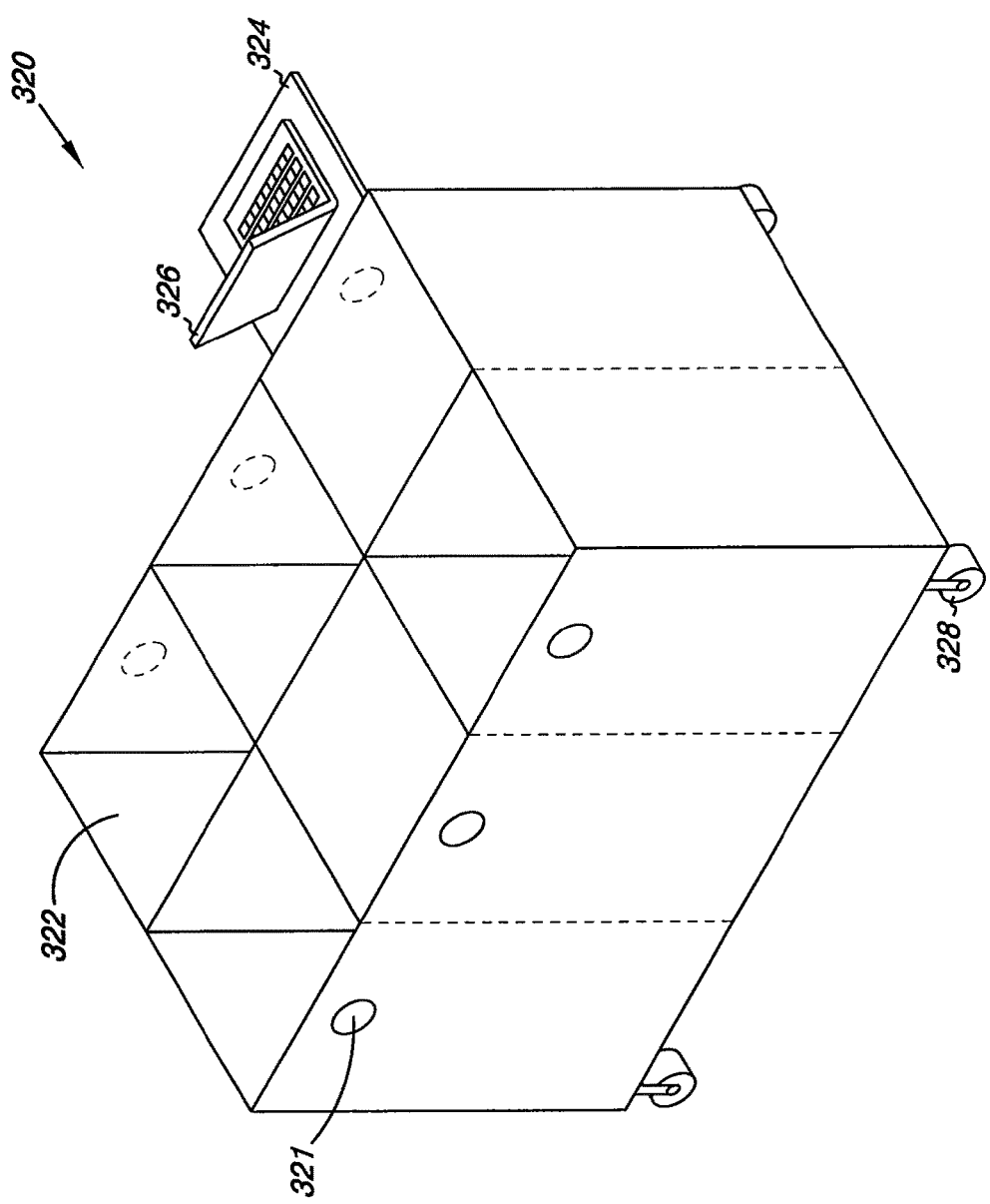
FIG. 14 is a perspective view of a retrieval cart, according to one embodiment of the present invention.

Dry goods can be retrieved in a manner different from other types of products. FIG. 14 shows a cart 320 for retrieving dry goods according to one embodiment of the present invention. The cart 320 includes space for six totes 322 to be placed within the cart 320. Alternatively, the cart 320 can be sized to hold more or less totes 322. The cart 320 also provides a space 324 for a computer 326 and scanning equipment (not shown) that are integrally coupled with the computer system of the present invention. It should be understood that the space 324 can be located in any accessible area on the cart 320 that does not interfere with the totes 322 or the adding or removal of products from those totes 322. Four wheels 328 are attached to the bottom of the cart 320 to facilitate transporting the cart 320 within the dry goods area 206 and from the dry goods area 206 to the delivery area 212. It should be understood that further embodiments of this cart could be used to retrieve any type of products.

In an alternative embodiment, the cart depicted in FIG. 14 is outfitted with identification buttons 321 for each tote 322, each tote 322 corresponding to a different order. Alternatively, any known indicating mechanism can be used with the cart 320. The identification buttons 321 communicate with the computer system of the present invention through the computer 326 associated with the cart 320.

Figure 15:
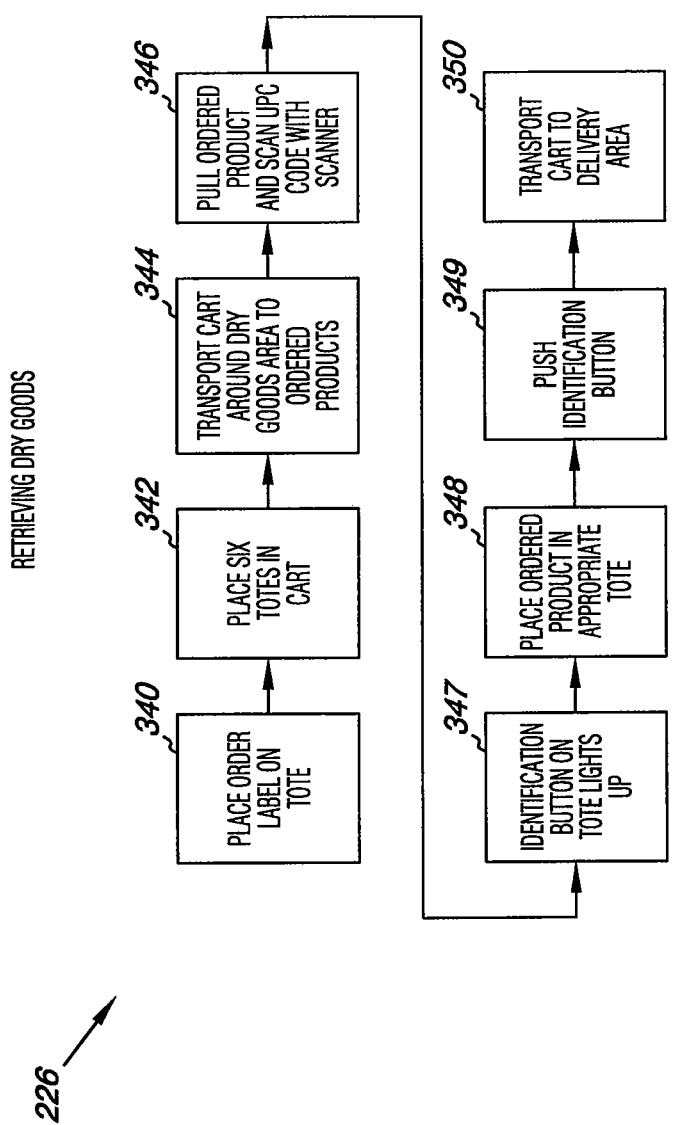
FIG. 15 is a flow diagram of a method of retrieving dry goods, according to one embodiment of the present invention.

The cart 320 can be used in a method for retrieving the dry goods. FIG. 15 shows a method of retrieving dry goods 226 from the dry goods area 206 according to one embodiment of the present invention. First, an order label is placed on a tote (block 340) and six such totes are placed in the cart (block 342). Alternatively, any number of totes 322 can be placed in the cart 320 depending on the number of orders to be filled and the size of the cart 320. In a further alternative, a master list is provided including all the ordered products for all the orders corresponding to the totes 322 in the cart 322. The cart 320 can be transported around the dry goods area to the ordered products (block 344). The ordered products are pulled and the UPC code on the product is scanned with the scanner (block 346). In one embodiment, scanning the UPC code causes the system of the present invention to identify the ordered product and determine which tote 322 corresponds to the appropriate order. Upon identifying the appropriate tote 322, the system causes the identification button 321 on that tote to light up (block 347), thus signaling that the ordered product is required for that particular tote 322. The ordered products are then placed in the appropriate tote corresponding to the appropriate order (block 348) and the identification button 321 is pushed to indicate that the product has been placed in that tote 322 and to turn off the light (block 349). Subsequently, the cart is transported to the delivery area (block 350). It should be understood that further embodiments of this method could be used to retrieve any type of products.

Figure 16:
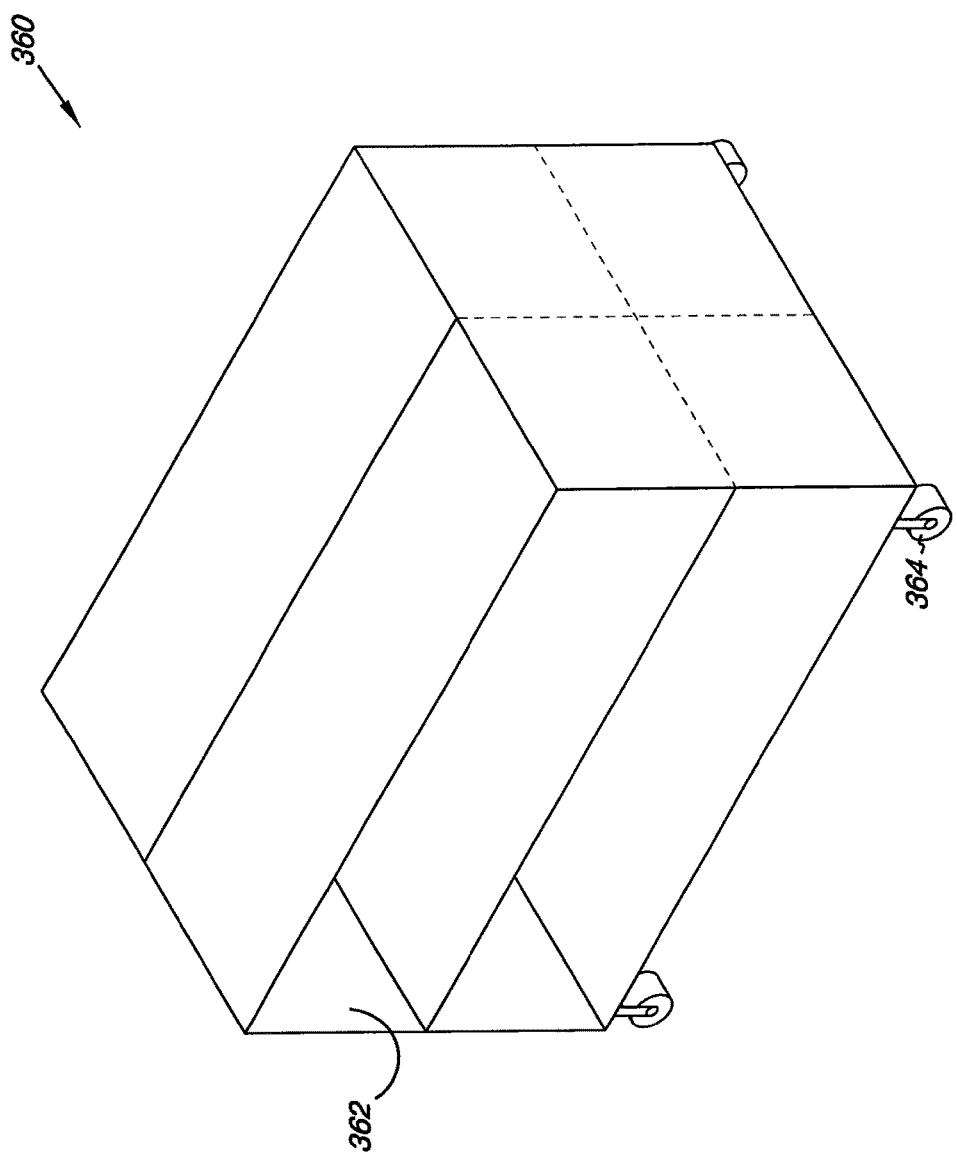
FIG. 16 is a perspective view of a retrieval cart, according to one embodiment of the present invention.

Bulk goods are larger or more voluminous versions of dry goods, and thus may require a different retrieval system. FIG. 16 depicts a cart 360 for retrieving bulk goods according to one embodiment of the present invention. The cart 360 has four cages 362 or compartments for holding retrieved products. Alternatively, the cart 360 has more than four cages 362. Like the dry goods cart 320, the bulk goods cart 360 has four wheels 364 in order to be moved easily around the bulk goods area 208 and from the bulk goods area 208 to the delivery area 212. In a further aspect of the invention, the bulk goods may be retrieved using any transport device having one or more compartments for holding large or voluminous products. It should be understood that further embodiments of this cart could be used to retrieve any type of products.

Figure 17:
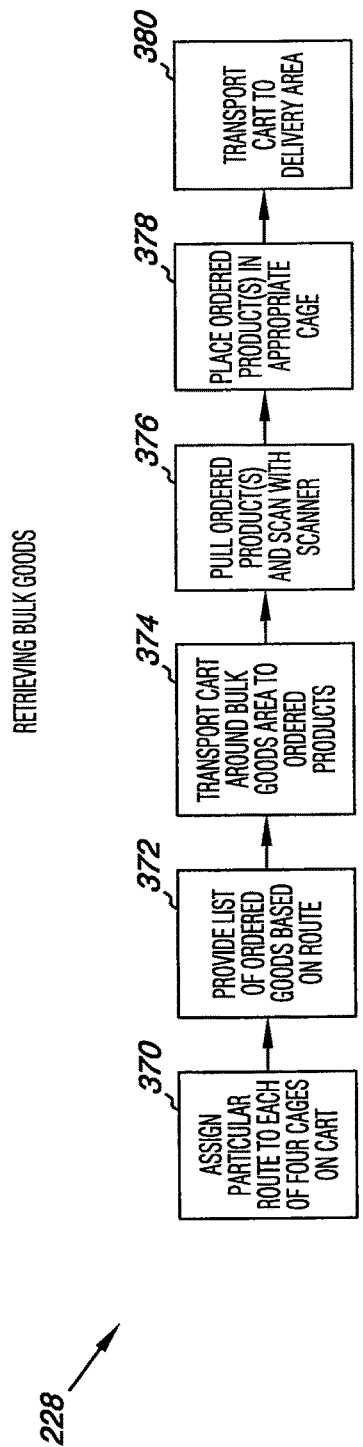
FIG. 17 is a flow diagram of a method of retrieving bulk goods, according to one embodiment of the present invention.

FIG. 17 shows a method of retrieving bulk goods 228 according to one embodiment of the present invention. The efficiency and speed of bulk good retrieval is enhanced by retrieving products based on the delivery route the products are assigned to. First, a particular delivery route is assigned to each of the four cages on the cart (block 370). In one aspect of the invention, the system provides a list of the ordered goods based on the assigned route (block 372). That is, there is a list of ordered goods provided for each delivery route. The cart is transported around the bulk goods area to the ordered products (block 374) and the ordered products are pulled and scanned with a scanner (block 376) to indicate that the product has been retrieved. After scanning, the ordered product is placed in the appropriate cage (block 378) related to the appropriate route and the cart is subsequently transported to the delivery area (block 380). It should be understood that further embodiments of this method could be used to retrieve any type of products.

Figure 18:
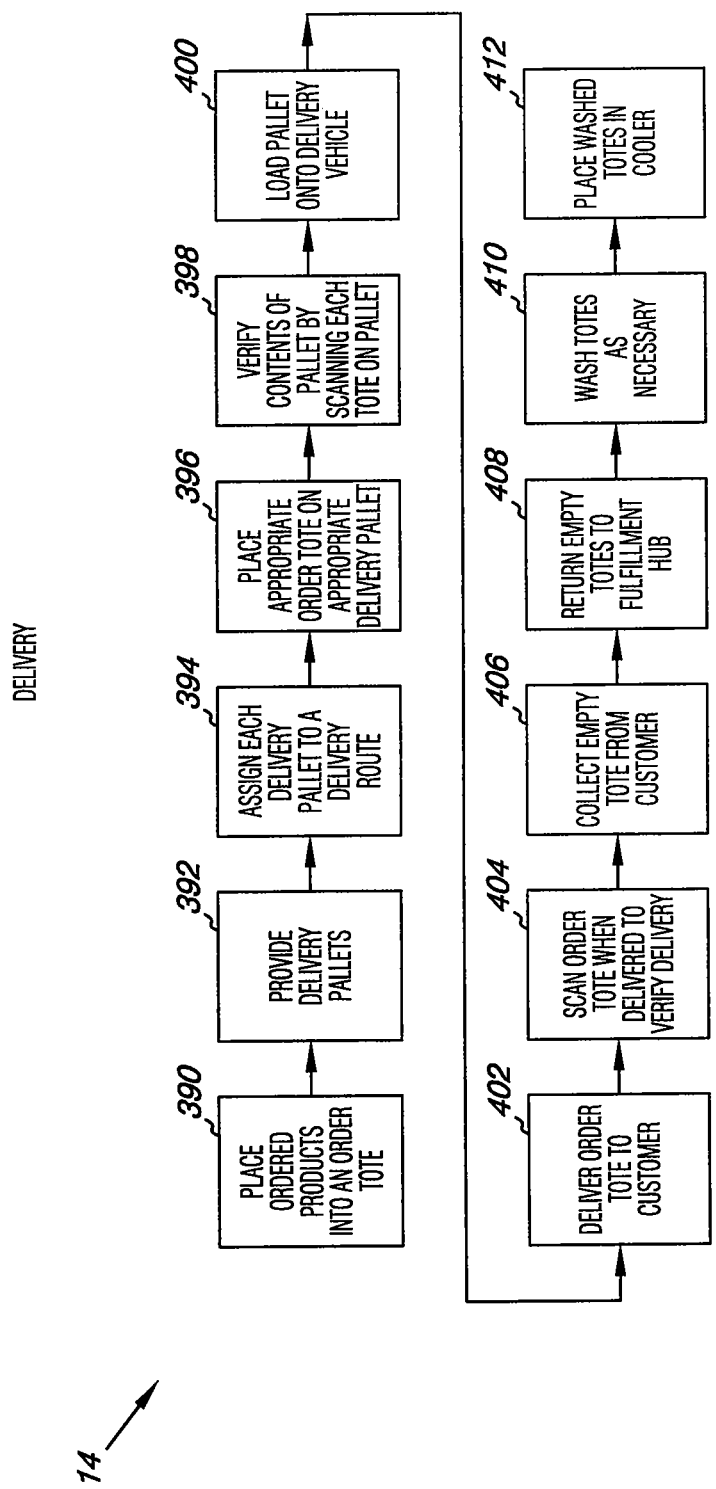
FIG. 18 is a flow diagram of a method of delivery, according to one embodiment of the present invention.

After retrieval and transport of the ordered products to the delivery area, the products are delivered to the customer. FIG. 18 shows a method of delivering the ordered products or delivery system according to one embodiment of the present invention. After the ordered products are transported to the delivery area 212 from each of the subgroup areas from which they were retrieved, they are placed into an order tote (block 390). That is, all ordered products from a particular order are placed into one tote. Alternatively, the ordered products are placed in any known transport device for delivery of the products to the customer. Delivery pallets are provided at the delivery area (block 392) and each pallet is assigned to a delivery route (block 394). Alternatively, any apparatus appropriate for holding several packages to be loaded onto and off of a delivery vehicle may be used. Each order tote is then placed on the appropriate delivery pallet (block 396). That is, each order tote is placed on a delivery pallet designated for the appropriate delivery route. After all the orders for a particular route are placed on a designated pallet, the contents of each pallet are verified by scanning each tote on the pallet (block 398) to ensure that all order totes are on the appropriate delivery pallets. After verification, each delivery pallet is loaded onto the delivery vehicle (block 400) and each order tote is then delivered to the appropriate customer (block 402). As each order tote is delivered, the tote is scanned to verify that delivery has occurred (block 404). During the delivery, empty totes from previous deliveries are collected from the customer (block 406) and ultimately returned to the fulfillment hub (block 408). Alternatively, the order totes are not left with the customer, but rather are emptied during delivery and retained by the delivery person. Upon return of the empty totes to the hub, some totes are washed (block 410) based on the condition of each tote and the type of products that had been placed in the tote. The washed totes are then placed in a cooler (block 412). Alternatively, totes are transported to the tote preparation area 214.

Although the present invention has been described with reference to preferred embodiments, persons skilled in the art will recognize that changes may be made in form and detail without departing from the spirit and scope of the invention.

The invention claimed is:

1. A computer-implemented method for fulfilling a plurality of network-based product orders in a warehouse using a wheeled cart, comprising:
storing, in a database, a plurality of network-based product orders;
utilizing a processing system to perform the steps of:
associating each of the orders with at least one of a plurality of order fulfillment spaces contained in a wheeled cart, each of the order fulfillment spaces including an actuable indicator communicatively coupled to the processing unit and configured to notify a user of the wheeled cart;
receiving, from an electronic scanner communicatively coupled to the processing unit, data identifying at least one product to be retrieved;
receiving from the electronic scanner, data related to a scanned code associated with the at least one identified product to be retrieved for at least one of the plurality of network-based product orders, the at least one identified product located in the warehouse;
identifying a network-based product order including the at least one identified product associated with the data related to the scanned code;
transmitting a signal to the actuable indicator associated with the order fulfillment space corresponding to the identified network-based product order containing the at least one identified product with the scanned code, wherein the transmitted signal causes the actuable indicator to turn on; and
receiving a signal indicating the at least one identified product corresponding to the identified network-based product order has been added to the order fulfillment space, wherein the signal causes the actuable indicator to turn off.

2. The method of claim 1, wherein the plurality of network-based product orders are grouped according to a subgroup area in which the products within the product orders are located in the warehouse.

3. The method of claim 1, wherein one or more of the plurality of network-based product orders are subgroup orders, and upon fulfilling the subgroup orders, the subgroup orders are transported to a hub for aggregation with one or more other subgroup orders.

4. The method of claim 3, wherein the one or more other subgroup orders are filled in parallel with filling the subgroup orders associated with the wheeled cart.

5. The method of claim 1, wherein the warehouse comprises a plurality of different subgroup areas.

6. The method of claim 5, wherein at least one of the subgroup areas comprises a conveyor belt configured to transport a plurality of totes.

7. The method of claim 6, wherein the at least one of the subgroup areas comprises a cold goods area divided into individual zones, the zones connected by the conveyor belt.

8. The method of claim 1, further comprising providing an order label for each of the plurality of orders, each order label comprising a bar code associated with the products in an order from the plurality of orders,
wherein the data identifying at least one product to be retrieved is based on at least one scanned bar code from the plurality of provided order labels.

9. The method of claim 1, wherein the scanner is cordless.

10. The method of claim 1, comprising lighting an identification button in a bay of the warehouse corresponding to the data identifying at least one product to be retrieved.

11. The method of claim 10, further comprising providing, at a display, a required quantity of the at least one product to be retrieved.

12. The method of claim 1, further comprising confirming, at the processing system, an order deadline confirmation, wherein the order deadline confirmation distinguishes qualifying orders that qualify for a next-day delivery from non-qualifying orders that do not qualify for the next day delivery.

13. The method of claim 12, wherein the non-qualifying orders become qualifying orders after a period of time.

14. The method of claim 1, further comprising planning a delivery route based on the plurality of network-based product orders.

15. The method of claim 1, wherein the plurality of order fulfillment spaces contained in the wheeled cart is configured to receive a plurality of totes, and wherein the wheeled cart further defines a space configured to mount a computer and scanning equipment.

16. The method of claim 1, wherein the wheeled cart comprises a plurality of cages configured to receive bulk goods.

* * * * *